United States Patent [19]

Lehmann

[11] Patent Number: 5,333,491

[45] Date of Patent: * Aug. 2, 1994

[54] METHOD FOR REDUCING TEST CYCLE TIME AND FOR IMPROVING MEASURING ACCURACY AT A LEAK TESTING PROCESS

[76] Inventor: Martin Lehmann, Obere Farnbuhlstr 1,, CH-5610 Wohlen, Switzerland

[*] Notice: The portion of the term of this patent subsequent to Aug. 27, 2008 has been disclaimed.

[21] Appl. No.: 15,839

[22] Filed: Feb. 10, 1993

Related U.S. Application Data

[63] Continuation of Ser. No. 696,917, May 8, 1991, Pat. No. 5,199,296, which is a continuation-in-part of Ser. No. 469,398, Jan. 24, 1990, Pat. No. 5,042,291.

[30] Foreign Application Priority Data

Jan. 27, 1989 [DE] Fed. Rep. of Germany ....... 3902435

[51] Int. Cl.[5] .............................................. G01M 3/32
[52] U.S. Cl. .......................................... 73/49.3; 73/52
[58] Field of Search ................ 73/49.3, 52, 45.4, 45.3, 73/49.2

[56] References Cited

U.S. PATENT DOCUMENTS 5,042,291 8/1991 Lehmann ..................... 73/49.3

Primary Examiner—Hezron E. Williams
Assistant Examiner—Joseph W. Roskos
Attorney, Agent, or Firm—Antonelli, Terry, Stout & Kraus

[57] ABSTRACT

A method and test chamber for leak testing a container with a substantially flexible wall portion wherein the container is introduced into a test cavity so that the wall portion of the container is spaced from an inner adjacent wall portion of the test cavity with a gap being defined between the wall portion of the cavity and the flexible wall portion of the container. A pressure difference is installed as an initial value between the interior of the container and at least the gap by applying a pressure at least to the gap which is smaller than a pressure inside the container. The flexible wall portion is supported form its exterior side within the test cavity so as to prevent the flexible wall portion from bending outwardly into contact with the wall portion of the test cavity as a result of the pressure difference. The time course of a pressure prevailing within the gap is measured as a leak indicative signal.

9 Claims, 3 Drawing Sheets

METHOD FOR REDUCING TEST CYCLE TIME AND FOR IMPROVING MEASURING ACCURACY AT A LEAK TESTING PROCESS

RELATED APPLICATION

This application is a continuation of U.S. application Ser. No. 07/696,917 filed May 8, 1991 now U.S. Pat. No. 5,199,296, which is a continuation-in-part of copending U.S. application Ser. No. 07/469,398 filed Jan. 24, 1990 now U.S. Pat. No. 5,042,291.

FIELD AND BACKGROUND OF THE INVENTION

The present invention relates in general to a method for leak testing of a container, to a test chamber therefor and to a test machine for in-line testing of such containers. More particularly, the present invention is directed to a method for reducing test cycle time and for improving the measuring accuracy at a leak testing process as well as to a test chamber and to a test machine with reduced test cycle time and improved measuring accuracy.

Methods for leak testing of containers are known at which a pressure difference is applied between the interior and the exterior of a container to be tested as an initial value for latter measuring. Afterwards, the time course of a pressure value, which is dependent from the pressure difference installed as the initial value and from leakage conditions of the container to be tested, is measured, significant for leak conditions of the container under test.

Such a leak testing method is e.g. known from the German laid open print no. 24 47 578. This reference provides for a testing method to test the welding seam of such container with respect to leakage. Therefore such containers are pressure loaded inside and also outside, through an opening of the container to be tested. There is provided separately a test channel around the welding seam of the container and leakage is monitored by measuring the time course or timely development of pressure within said test channel. This measuring is indicative for the leakage of the welding seam of the open container.

From the German laid open print no. 21 15 563 it is further known to test the seam of containers which are closed by a foil lid. Thereby, the bottom of the container is perforated by means of a needle-like end part of a pressure line, by which the inside of the container is pressurized. By monitoring the time course of the inside pressure of the container, an indication is provided indicative of tightness of the container.

From the article "Lecksuche mittels Differenzdruckmessungen" from J.T. Furness, VFI 4/78, it is generally known to test a container on leakage by monitoring its internal or its external pressure. Thereby it is described that the smaller that a volume is selected wherein the time course of pressure is monitored, the more accurate such a measuring will become.

There exists a clear need for shortening the time span necessitated for a test cycle of a container on one hand and of improving the accuracy of such tests to be able to detect smallest leakages of such containers.

SUMMARY OF THE INVENTION

It is an object of the present invention to shorten the time span necessitated to leak test a container and to simultaneously improve the measuring accuracy for leak detection, thus leading to the possibility to detect significantly reduced leakages in shorter test time.

According to the present invention, this is achieved by a method for reducing a test cycle time and for improving measuring accuracy at a leak testing process for a container whereby such a leak testing process comprises installing of a pressure difference between the interior of the container and the exterior thereof as an initial value. The leak testing process further comprises measuring of a time course of a pressure value which is dependent from the pressure difference previously installed as the said initial value and from leakage of the container under test. Measuring of the said pressure value results in a leak indicative measurement. Reducing of test cycle time and simultaneously improving measuring accuracy is realized by installing the pressure difference as the said initial value, in that a predetermined pressure is installed at the exterior of a closed container without its closed integrity being destroyed. As measuring of the time course of the said pressure value dependent from the pressure difference installed and from the container leakage, the time course of the pressure of the exterior of the closed container is measured.

Further, the volume of the exterior of the closed container at which the predetermined pressure is installed and at which the time course of the pressure is measured, is minimalized, in that the invention departs from the recognition that, for such closed container testing, one and the same volume is substantially determining test cycle time and measuring accuracy and that both may be optimized by minimalizing one and the same volume, namely said pressurized external volume of the container under test.

With respect to leak testing of closed and especially of prefilled containers within test chambers, it is known to install at the exterior of such a container either over- or under-pressure, as an initial value, then to shut off the test chamber from overpressure or underpressure sources and then to monitor the pressure course at the remaining volume between the interior wall of the test chamber and the container installed therein. The measuring cycle time per container is significantly dependent from the extent of the said remaining volume, between wall of the test chamber and container therein. The bigger that such a volume is selected, the longer the measuring cycle will last, because loading with overpressure or evacuation will consume the more time the larger that the said remaining volume is selected.

Further, a leak of a predetermined extent of said container and the respective stream of pressurizing gas from the outside to the inside of the container to its outside—in the case of underpressure at the container outside—, will result in a smaller detectable pressure change signal the bigger that the said remaining volume is selected.

For leakage tests of such closed and especially of filled containers up to now a straightforwards approach was practiced in using cylindric test chambers.

Therefrom, it may be seen that the present invention departs from the recognition that for testing closed containers the same volume, namely the said remaining volume, is responsible for the extent of the measuring cycle time as well as for the measuring accuracy and that by the most simple measure, namely of reducing the said volume, both the said criteria are optimized, namely the cycle length is minimized and the measuring accuracy maximized.

An inventive test chamber with improved test cycle time and measuring accuracy for a container which has a cross-sectional area diminishing along the direction of a transverse axis through the container, comprises a closable test cavity for introducing the container; means for installing a pressure difference as an initial value between the inside of the container and the remaining volume of the test cavity once the container is introduced therein; means for measuring a pressure value which is dependent from the pressure difference installed and the leakage of the container, whereby the shape of the cavity is selected to be at least substantially geometrically similar to the shape of the container, so as to minimize the remaining volume and whereby the means for installing and the means for measuring communicate with the remaining volume so as to test a closed container without destroying its closed integrity.

By the fact that for a closed container the shape of the test cavity is selected to be at least substantially similar to the shape of the container and thus has an open cross-section area which diminishes along an axis of the cavity as does the cross-sectional area of the container, a minimal volume difference between the volume of the test cavity and the volume of the container is realized, and thus a minimal remaining volume defined as above. For leak testing the said container within said test cavity and so as to not destroy its closed integrity, the means for installing the pressure difference and the means for monitoring the time course of the leak significant pressure signal are connected to the remaining volume between inside of the test cavity and the container introduced therein.

Another method of the invention for leak testing a container, closed with a foil-like lid fixed to a projecting rim of the container, comprises the steps of disposing the closed container into a test receptacle, supporting the closed container within the receptacle at the projecting rim on a border area of the receptacle, so as to form a first test volume between an inner wall of the receptacle and the wall of the container. The receptacle is sealingly closed with a cover so as to provide a second test volume between the cover and the foil-like lid of the container. The first and second test volumes are connected to form a combined test volume along a predominant part of the container closed by the lid. A pressure difference between the combined test volume and a pressure inside the container is established as an initial value, and a pressure prevailing within the combined test volume is monitored as a leak indicative signal.

The means connecting the first and second test volumes to form a combined test volume along a predominant part of the container closed by the lid in the test chamber of the invention for leak testing a container according to the aforementioned method includes a plurality of spaced grooves extending in the receptacle from the inner wall of the receptacle and the first test volume to the second test volume at a location radially outward of the border area of the receptacle supporting the projecting rim of the container. In this form of the test chamber of the invention, seal means are located between the cover and the receptacle radially outward of the border area of the receptacle supporting the projecting rim of the container for sealingly closing the receptacle together with the cover. In another form of the test chamber of the invention, the cover sealingly closes the receptacle by pressing the projecting rim of the container between the cover and the border area of the receptacle.

The above and other objects of the present invention will become more apparent as the description proceeds.

DESCRIPTION OF THE DRAWINGS

The above and other features of the present invention will be more readily understood when the following detailed description is considered in conjunction with the accompanying drawings, in which.

DETAILED DESCRIPTION

Figure 1:
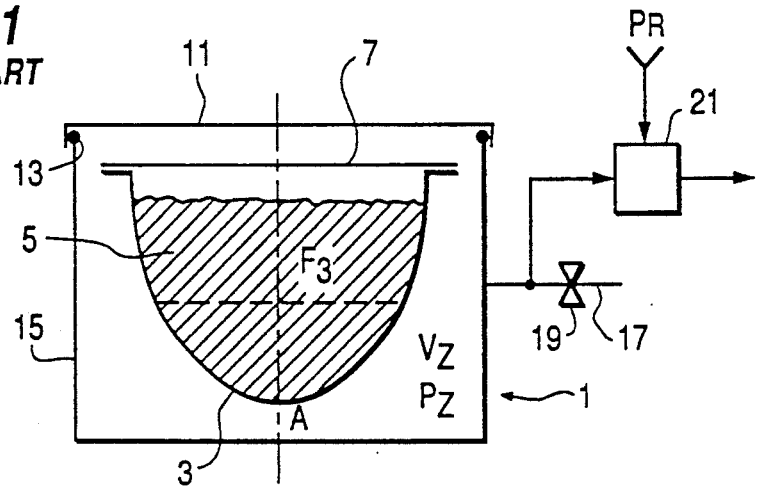
FIG. 1 shows schematically a prior art test chamber and its use for leak testing of closed and filled containers which containers have a diminishing cross-sectional area seen in direction of a transverse container axis.

In FIG. 1 there is schematically shown a test chamber 1 as it is known also for leak testing of closed containers 3, which, seen in direction of an axis A of the container, have a diminishing cross-sectional area $F_3$. The container 3 is filled with a filling material 5 and is e.g. closed by a covering foil-like lid 7. The foil-like lid 7 is fixed along its periphery to container 3, e.g. by gluing or welding. Such a container may be a plastic material cup being closed by an aluminum foil 7.

For leak testing, such containers 3 are introduced into the test chamber 1 which then is hermetically closed by means of a cover 11 and a seal 13. Between the container 3 and the interior wall of the test chamber, which latter consists of the cover 11 and the chamber receptacle 15, there is defined a remaining volume $V_z$ which is pressurized by the test pressure $p_z$ which test pressure is different from the pressure inside the closed container 3.

This is realized, as may be seen schematically from FIG. 1, by means of a pressurizing feed line 17 with a valve 19. After pressurizing the remaining volume $V_z$ the valve 19 is closed and the time development of the pressure $p_z$ within the remaining volume $V_z$ is monitored, e.g. with the help of a pressure sensor 21, which is preferably a difference pressure sensor. There is led to one of the pressure inputs of the difference pressure sensor a reference pressure $p_R$, to the other of its inputs the pressure $p_z$ of the remaining volume $V_z$ which is on one hand dependent from the pressure previously installed before the valve 19 was shut and from leakage of the container 3.

If, as a testing pressure, a pressure is applied to the remaining volume $V_z$ which is lower than the pressure residing inside the container 3, then a leak of the container 3 will result, after shutting valve 19, in a rising pressure in the remaining volume $V_z$ because of the gas exchange stream out of container 3 through the leak of the container 3, into the volume $V_z$.

Inversely, a reduction of pressure in the remaining volume $V_z$ will be registered due to a leak of the container 3 if, as a test pressure, an initial pressure is applied to the remaining volume $V_z$ which is higher than the pressure residing inside the container 3.

To initially apply the test pressure $p_z$ to the remaining volume $V_z$ as an initial value for testing, a gas volume must be fed to or removed from the said remaining volume $V_z$, the amount of which being the larger, the bigger the said remaining volume $V_z$.

The amount of gas which has to be fed or removed so as to install the test pressure $p_z$, as an initial value, directly influences the time span necessitated to reach the test pressure initial value, given a defined power of a pressurizing or evacuation source connected to the feeding line 17. The smaller that the remaining volume $V_z$ is selected, the smaller the time span for reaching a predetermined test pressure $p_z$ as said initial value will be.

Further, by a given leak and by a given initial test pressure $p_z$, and thus an initial, given pressure difference between pressure in the remaining volume $V_z$ and pressure in the interior of the container 3, the amount of gas flowing out of such leak per time unit is defined. Thus, a change of pressure within the remaining volume $V_z$ as a result of leakage will become the bigger, the smaller that the said remaining volume $V_z$ is.

Figure 2:
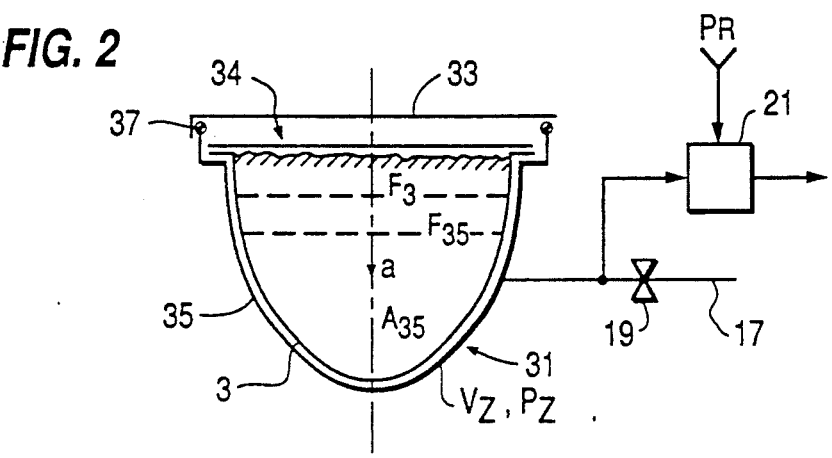
FIG. 2 shows schematically and in analogue representation to FIG. 1, an inventive test chamber realized according to the inventive method.

To optimally exploit these conditions as schematically shown in FIG. 2, the test chamber is tailored so that it defines together with an introduced container 3 to be tested, an optimally small remaining volume $V_z$.

The inventive test chamber 31, shown schematically in FIG. 2, comprises a one side open receptacle 35 with an opening 34, whereby cross-sectional areas $F_{35}$ of the receptacle 35, seen from the opening 34, continuously diminish. The diminution of the cross-sectional area $F_{35}$ along the axis $A_{35}$ preferably accords to the diminution of the cross-sectional area $F_3$ of a container 3 to be tested and to be therefore introduced into the test chamber 31. Thus, the wall of the container 3 and the inside wall of the test chamber 31 will be substantially equidistant, once such a container 3 is introduced into the test chamber 31. Thus, the remaining volume $V_z$ is minimalized.

The inventive test chamber 31 comprises a cover 33 which sealingly closes with schematically shown seals 37 the test chamber 31 after a container 3 to be tested has been introduced therein. Application of the initial test pressure and monitoring the time course of pressure at the remaining volume $V_z$ is realized the same way as was described for prior art test chambers and methods according to FIG. 1.

Figure 3:
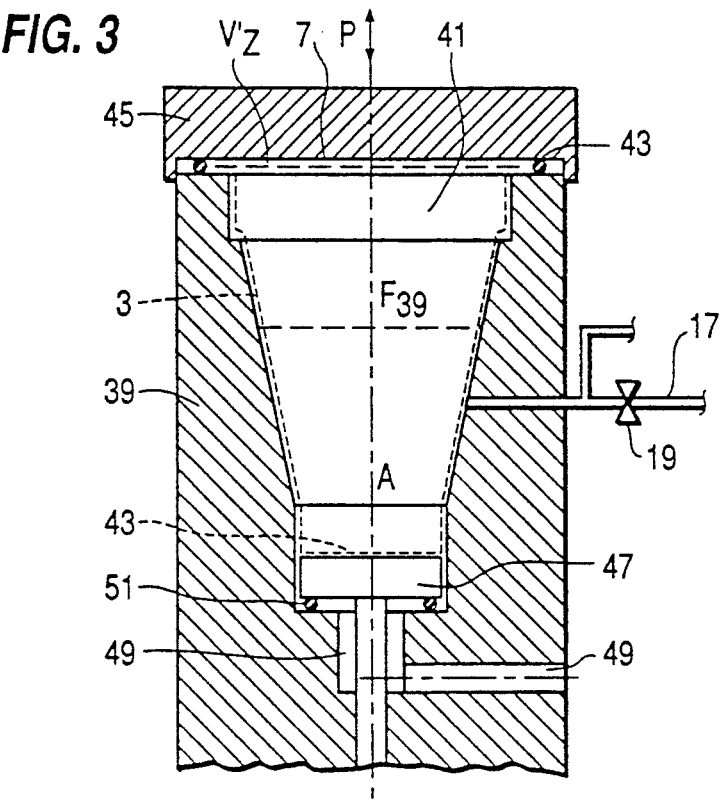
FIG. 3 shows schematically in a cross-sectional representation a preferred embodiment of an inventive test chamber for leak testing of cup shaped containers as of yogurt cups.

In FIG. 3 there is shown a preferred embodiment of an inventive test chamber again schematically. As an example it is constructed for testing closed containers 3 of substantial truncated cone form, as for testing yogurt cups, with respect to leakage.

A container 3 to be tested and with a covering lid 7 is shown in dashed lines. The inventive test chamber comprises a receptacle 39 which is formed according to the outside form of the container 3. The cross-sectional area of the receptacle 39, $F_{39}$ diminishes in direction of the central axis A substantially cone-like departing from a receptacle opening 41, towards the bottom 43 of the receptacle 39 and defines a cavity which is substantially similar in the sense of geometric similarity with the container 3, so that, when the container 3 to be tested is introduced, there are defined between its wall and the inside wall of the receptacle 39 substantially constant distances.

Adjacent to the opening 41 of the receptacle 39 there is preferably provided a positioning groove for a collar which is usually provided at such containers to which collar the covering foil-like lid of the container is welded (not shown).

The test chamber further comprises a cover 45 which is movingly driven as shown by reference P and is moved towards or from the receptacle 39, so as to either sealingly close it with the help of the seals 43 or to open it.

At the bottom of the receptacle 39 there is provided an axially movable and controllably driven piston 47 which is retracted, when a container 3 is to be tested is introduced in the test chamber and during the testing of the container, and which, after opening the cover 45, is driven into the test chamber, so as to eject the tested container 3. The piston 47 comprises an enlarged piston head.

At the bottom of the receptacle 39, adjacent to the piston head, a drain sleeve 49 enters into the test chamber which is sealingly closed by means of the head of the piston 47 by means of seals 51, once the piston 47 is retracted. Thus, after testing a container 3 which was leaking, so that material contained in the container 3 could possibly penetrate into the test chamber, the test chamber may be rinsed after the piston 47 has been driven into the test chamber 31 to eject the leaking container 3. Thus, the test chamber 31 is rinsed and the rinsing liquid will be drained out of the open drain sleeve 49. For further improving rinsing of the test chamber, there may be provided, as at the cover 45, a rinsing liquid feed line, possibly with a nozzle arrangement, to eject rinsing liquid into the test chamber (not shown).

Preferably, and especially for use with containers which are closed by means of a covering foil 7, as yogurt cups etc., the test chamber is so arranged that its opening 41 points upwards. By this one prevents that filling material within container 3 drops on the covering lid which could lead to deterioration of leak testing and especially leak testing of the weld seam between covering lid 7 and the wall of the container, because the lid 7 would then be loaded by filling material to a condition not nominal.

The test chamber according to FIG. 3 comprises, as again schematically shown, pressure feed and pressure monitoring means as were described in connection with FIG. 1 and 2.

For leak testing of containers, as of yogurt-, cream- etc. cups, continuously in line with filling and closing operations for such containers, by which leak testing e.g. every container of the production shall be tested, a multitude of inventive test chambers, one of which having been described with the help of FIG. 3, are combined to form a test machine. In such a machine the multitude of test chambers according to FIG. 3 are preferably arranged on a turnably driven carousel table (not shown), so that, in line with filling and closing of the containers, all of them are pressure leak tested before these containers are stored ready for package. Especially for testing of containers with a flexible wall by means of applying under-pressure, areas of the container walls may be pressed on the inner wall of the test chamber. To prevent this it may be advisable to provide a mesh inlay along and slightly distant from the wall of the test chamber, so e.g. in the form of a cone-shaped mesh inlay which is open at its bottom end and in which the container 3 to be tested is introduced. Such a mesh inlay mechanically stabilizes the wall of the container 3 with respect to outwards bending. Thus, with the help of such a mesh inlay it is prevented that the flexible container wall is bent so as to tightly reside on the inner wall of the test chamber when under-pressure is used as a test pressure in the remaining volume $V_z$. Possibly pressure equalizing connections are provided between the lower part of the receptacle 39 and the upper part adjacent to the cover 41 to ensure pressure equalization all around a container 3 to be tested, if a cover of the container tends to sealingly separate the lower part volume of the test chamber from the said upper part volume.

Such connections between lower and upper parts of the test chamber to provide for equalization of the pressure may be provided by appropriate grooves at the cover region of the test chamber, linking the lower part of the remaining volume $V_z$ with the upper part $V'_z$ thereof.

Thus, providing a receptacle, the open cross-sectional area thereof diminishing in direction towards the bottom of the receptacle and comprising a cover for tightly closing, there is realized a most simple test chamber, from which a container 3, once tested, may be removed without any problems.

It must be pointed out that the above described provision of a grid or mesh structured inlay into the test chamber may also prevent a mechanically deformed wall of a container under test to sealingly shut either an evacuation line for installing the initial test pressure and butting into the remaining volume $V_z$ or a measuring line for afterwards monitoring the time development of the pressure within the remaining volume.

Additionally, such a mechanical deformation of the container wall could lead to leakage of containers which would not occur if such a deformation is prevented as by the said mesh inlay.

Figure 4:
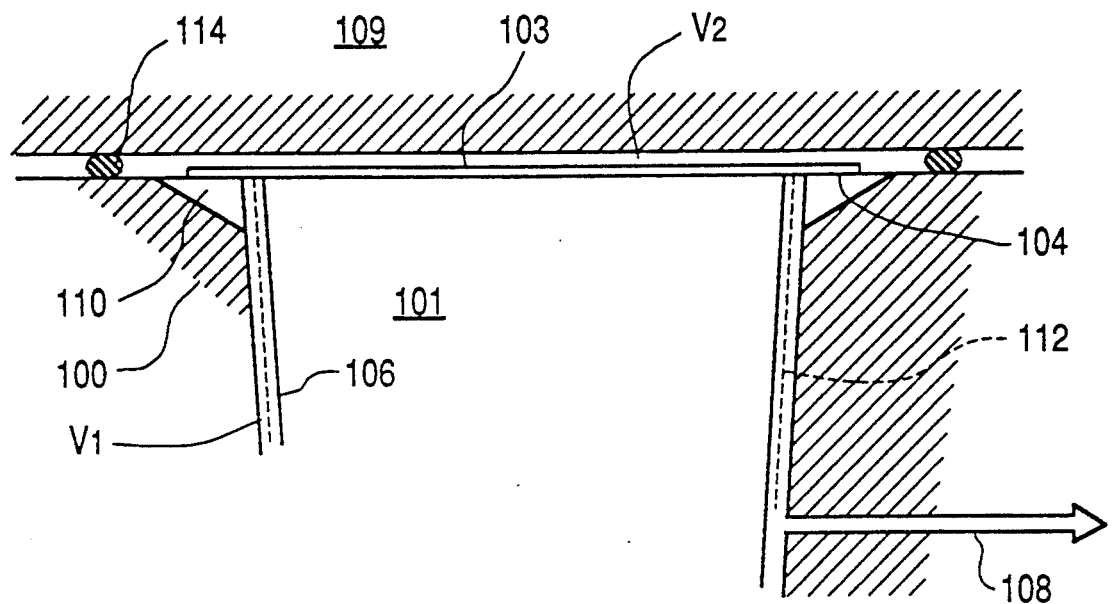
FIG. 4 shows a schematic, cross-sectional view of a portion of a test chamber of the invention, which could be used in the test chamber of FIG. 3, wherein a plurality of grooves connect respective volumes $V_1$ and $V_2$ for pressure equalization.

In FIG. 4 there is shown an enlarged view of a test chamber which could be employed in the apparatus of FIG. 3, for example. The test chamber of FIG. 4 comprises a receptacle 100 containing a container 101 covered with a foil-like cover 103 which is, e.g., glued to a radially projecting rim portion 104 of the container 101, as is known, e.g., from yoghurt containers. The rim portion 104 is supported on the border of a cavity defined within receptacle 100. The cavity defines, with respect to a flexible wall 106 of the container, a first test volume $V_1$. This volume $V_1$ is connected to a line 108 to apply pressure. A cover 109 closes the cavity of receptacle 100 and forms a second test volume $V_2$ over the container 101, so that the volumes $V_1$ and $V_2$ are interconnected by bypassing pressure connections 110 in the form of a plurality of spaced grooves. A cone-shaped mesh inlay 112, shown in dotted line, is provided for use with a pressure in the test volume, smaller than that within the container. The mesh inlay 112 is open at its bottom end and slightly distant from the wall of the test chamber. The mesh inlay stabilizes the flexible wall 106 of the container with respect to outwards bending as discussed above in reference to FIG. 3.

Figure 5:
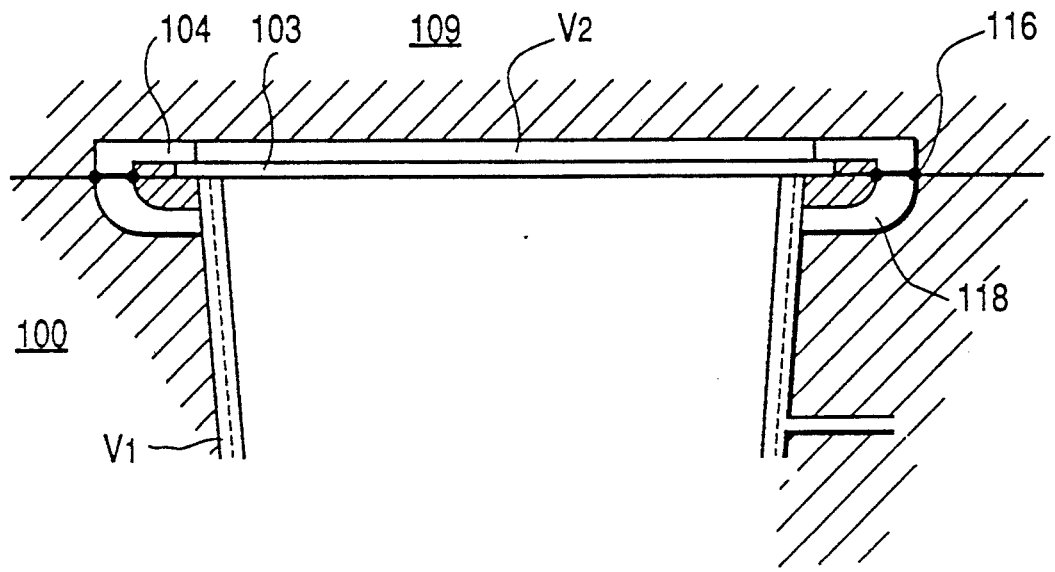
FIG. 5 shows a schematic, cross-sectional view of a portion of a test chamber according to another embodiment of the invention.

Another embodiment of the present invention is shown in FIG. 5 where sealing of the cover 109 with respect to the cavity defined within receptacle 100 is not performed by a special sealing as sealing ring 114 of FIG. 4, but is provided by pressurizing the rim portion 104 between the cover 109 and the border of receptacle 100. Thus, in this embodiment small sealing rings 116 are provided to just seal respective connecting lines 118 communicating the respective volumes $V_1$ and $V_2$. This embodiment could also be used upside down.

Figure 6:
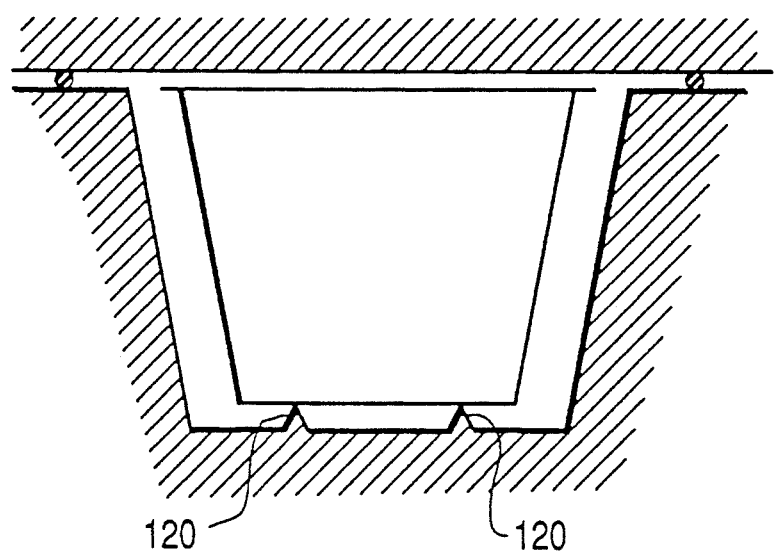
FIG. 6 shows a schematic, cross-sectional view of another feature of a test chamber of the invention which can be used in any of the other embodiments.

By the technique illustrated in FIG. 6 it becomes possible to surround the complete container to be tested by test volume and test pressure without any standing area for such container blocking a portion of the container. Thus, in a more general view, it would suffice to deposit the container to be tested at distinct points 120, as schematically shown in FIG. 6, to allow all around pressurizing. This feature of the test chamber and method of the invention could be employed with the mesh inlay of previous embodiments to stabilize the flexible side wall of the container.

I claim:

1. Test chamber for leak testing of a container, said container having a cross-sectional area diminishing along the direction of a traverse axis through said container, said test chamber comprising:
    a closeable test cavity for introducing said container;
    means for installing a pressure difference as an initial value between the inside of said container and the remaining volume of said test cavity, once said container is introduced therein;
    means for measuring a pressure value being dependent from said pressure difference installed and from leakage of said container;
    whereby the shape of said cavity being at least substantially geometrically similar to the shape of said container, so as to minimize said remaining volume; and whereby
    said means for installing and said means for measuring communicate with said remaining volume so as to test a closed container without destroying its closed integrity and further comprising an ejection piston provided at the bottom of said cavity, said ejection piston being controllably driveable into said cavity to eject a container therefrom.

2. The test chamber according to claim 1, said cavity being formed by a receptacle, the open cross-sectional area thereof diminishing in direction towards the bottom of said receptacle and comprising a cover for tightly closing said receptacle.

3. The test chamber according to claim 1, for containers substantially with a shape of a truncated cone, said cavity having at least substantially the shape of a truncated cone.

4. The test chamber according to claim 1, comprising a container to be tested, the wall of said closable test cavity being disposed at a substantially constant distance along the outside wall of said container.

5. The test chamber according to claim 1, further comprising at least along parts of the wall of said test cavity a mesh inlay.

6. The test chamber according to claim 1, said closable test cavity comprising a receptacle arranged so that its opening points upward.

7. The test chamber according to claim 1, said ejection piston comprising a piston rod and an enlarged piston head.

8. The test chamber according to claim 1, said container being a closed and filled container made of plastic material.

9. The test chamber according to claim 8, said container being filled with yoghurt.

* * * * *